(12) United States Patent
Takahashi et al.

(10) Patent No.: US 11,114,779 B2
(45) Date of Patent: Sep. 7, 2021

(54) TERMINAL BASE AND ELECTRICAL CONNECTION STRUCTURE OF DEVICES

(71) Applicant: YAZAKI CORPORATION, Tokyo (JP)

(72) Inventors: Kazuhide Takahashi, Makinohara (JP); Shoichi Nomura, Makinohara (JP); Eiji Aoki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/706,600

(22) Filed: Dec. 6, 2019

(65) Prior Publication Data
US 2020/0185844 A1 Jun. 11, 2020

(30) Foreign Application Priority Data
Dec. 11, 2018 (JP) .............................. JP2018-231551

(51) Int. Cl.
*H01R 12/58* (2011.01)
*H01R 13/40* (2006.01)
*H01R 12/67* (2011.01)

(52) U.S. Cl.
CPC ............ *H01R 12/58* (2013.01); *H01R 12/67* (2013.01); *H01R 13/40* (2013.01)

(58) Field of Classification Search
CPC . H02K 5/225; H02K 5/22; H01R 9/24; H01R 4/34; H01R 4/60; H01R 13/502
See application file for complete search history.

(56) References Cited

U.S. PATENT DOCUMENTS

| | | | | |
|---|---|---|---|---|
| 9,343,941 | B2 * | 5/2016 | Okamoto | H02K 11/33 |
| 10,074,926 | B2 * | 9/2018 | Rui | H01R 13/5205 |
| 10,116,093 | B2 * | 10/2018 | Ishibashi | H02K 5/225 |
| 10,630,021 | B2 * | 4/2020 | Shiraishi | H01R 12/716 |
| 10,693,258 | B2 * | 6/2020 | Imafuku | H01R 13/523 |

FOREIGN PATENT DOCUMENTS

| | | |
|---|---|---|
| CN | 105830280 A | 8/2016 |
| JP | 2002-305043 A | 10/2002 |
| JP | 2013-45510 A | 3/2013 |
| JP | 2015-62343 A | 4/2015 |
| JP | 2017-143024 A | 8/2017 |
| JP | 2018-166075 A | 10/2018 |

* cited by examiner

*Primary Examiner* — Jean F Duverne
(74) *Attorney, Agent, or Firm* — Kenealy Vaidya LLP (57) ABSTRACT

A terminal base includes a plurality of terminals configured to electrically connect a first device and a second device to each other, each of the plurality of terminals being electrically conductive and a housing configured to hold the plurality of terminals, the housing being made of an electrically insulating resin in which each of the plurality of terminals includes a first connection portion exposed to an outside of the housing so as to be connected to the first device, a second connection portion exposed to the outside of the housing so as to be connected to the second device, and an insert portion insert-molded in the housing and in which he insert portion has a solid cylindrical shape or a hollow cylindrical shape.

9 Claims, 12 Drawing Sheets

TERMINAL BASE AND ELECTRICAL CONNECTION STRUCTURE OF DEVICES

CROSS-REFERENCE TO RELATED APPLICATION

The present application claims priority to Japanese Patent Application No. 2018-231551 filed on Dec. 11, 2018, the entire content of which is incorporated herein by reference.

TECHNICAL FIELD

The present invention relates to a terminal base configured to electrically connect devices with each other. The present invention also relates to an electrical connection structure using this terminal base.

BACKGROUND

Figure 12A:
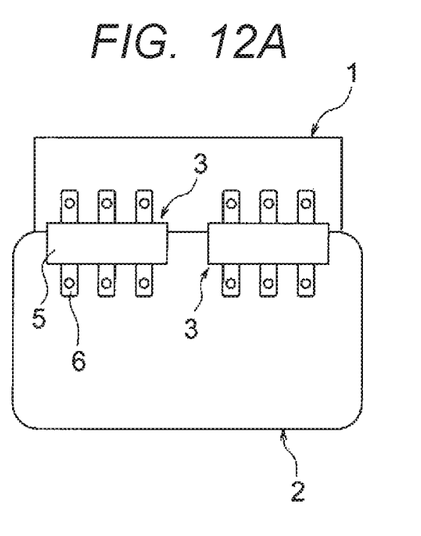
Figure 12B:
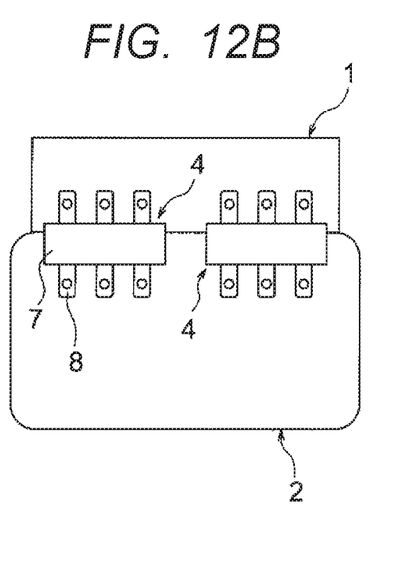
Figure 12C:
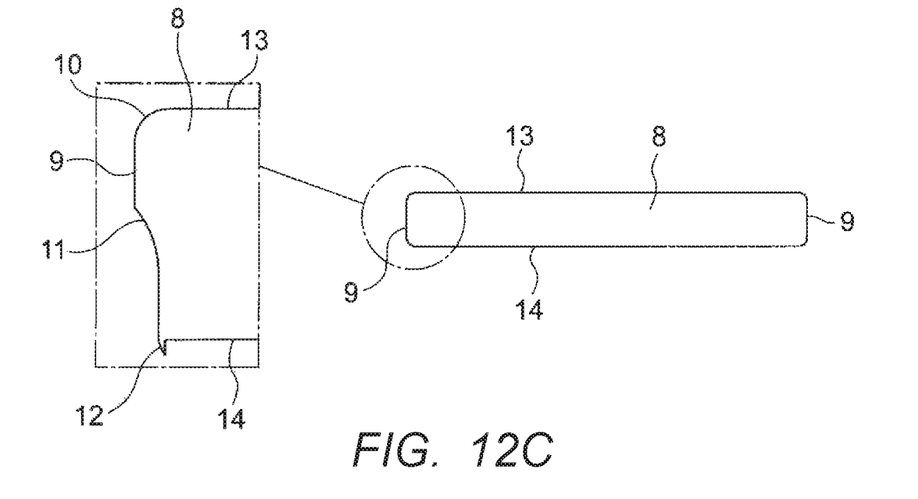
FIG. 12C is an illustrative view of a side surface of the terminal.

FIGS. 12A, 12B, and 12C illustrate a related art terminal base and a related art electrical connection structure of devices. As illustrated in FIGS. 12A, 12B, and 12C, an electric vehicle or a hybrid vehicle includes an inverter 1 and a motor 2 in addition to a high voltage battery. In order to electrically connect the inverter 1 and the motor 2, terminal bases 3 and 4 are used (for example, see JP2015-62343A, JP2017-143024A). The terminal base 3 includes an electrically insulating housing 5 attached across cases of the inverter 1 and the motor 2, and electrically conductive terminals 6 inserted into the housing 5, thereby being accommodated in the housing 5 in a locked manner. Meanwhile, the terminal base 4 includes a housing 7 and terminals 8 just like the terminal base 3. However, the terminals 8 are held by insert molding (resin molding) to the housing 7.

The terminals 8, which are a part of the terminal base 4, are manufactured by punching a electrically conductive metal plate. When the metal plate is punched (pressed), a sag 10, a fracture surface 11, and a burr 12 are generated on a side surface 9 of each terminal 8 and therefore the side surface 9 is uneven. Therefore, compared with a smooth front surface 13 and a smooth back surface 14 of each terminal 8, it is more difficult on the side surface 9 to manage a depth, a width, and the like of etching processing by laser. That is, in order to make an insert portion of the side surface 9 easy to be held by something utilizing surface processing, for example, when the etching processing by laser is performed, it is difficult on the side surface 9 to manage the depth, the width, and the like. In addition, when the generated burr 12 is relatively large, resin cracking occurs in the housing 7 due to an edge of the burr 12. If resin cracking occurs, the oil in a motor 2 may flow into the inverter 1. This leads to a decrease in reliability of the insert molding of the terminals 8.

SUMMARY

Illustrative aspects of the present invention provide a terminal base configured to sufficiently ensure reliability of insert molding of a terminal and an electrical connection structure of devices using this terminal base.

According to an illustrative aspect of the present invention, a terminal base includes a plurality of terminals configured to electrically connect a first device and a second device to each other, each of the plurality of terminals being electrically conductive; and a housing configured to hold the plurality of terminals, the housing being made of an electrically insulating resin. Each of the plurality of terminals includes a first connection portion exposed to an outside of the housing so as to be connected to the first device, a second connection portion exposed to the outside of the housing so as to be connected to the second device, and an insert portion insert-molded in the housing. The insert portion has a solid cylindrical shape or a hollow cylindrical shape.

Other aspects and advantages of the invention will be apparent from the following description, the drawings and the claims.

BRIEF DESCRIPTION OF DRAWINGS

FIGS. 10A and 10B are views of the terminal in FIG. 9, in which FIG. 10A is a perspective view, and FIG. 10B is a cross-sectional view;

FIGS. 12A, 12B, and 12C illustrate a terminal base and an electrical connection structure of devices in a related art, in which FIGS. 12A and 12B are schematic views.

DESCRIPTION OF EMBODIMENTS

According to an illustrative aspect of the present invention, an inverter (an example of a first device) and a motor (an example of a second device) to be mounted on an electric vehicle or a hybrid vehicle are connected electrically by a terminal base. The terminal base includes an electrically insulating housing attached across cases of the inverter and the motor, and a plurality of terminals insert-molded in the housing. The terminal includes a first connection portion exposed to a side of the inverter, a second connection portion exposed to a side of the motor, and an insert portion insert-molded in the housing. The insert portion is formed in a columnar shape or a cylindrical shape. A surface processed portion may be formed over an entire circumference of an outer surface of the insert portion.

According to this terminal base, the reliability of the insert molding of the terminal can be ensured sufficiently. The devices can also be connected with each other electrically and more efficiently.

A sag, a fracture, or a burr is not generated on the outer surface of the insert portion. Therefore, for example, when the etching processing is performed by laser, a laser depth, a width, and the like can be easily managed, and as a result, a better surface processed portion can be formed, and an insert molded state of the terminals can be stabilized. In other words, adhesion reliability of the terminals with the housing and waterproof at the surface processed portion can be ensured, and waterproof and oilproof properties can be improved.

In the terminal base, the first connection portion of the terminal may extend along a direction orthogonal to a direction to which the insert portion extends. The housing may be formed such that positions at which the insert portion of the each of the plurality of electrically conductive terminals are located in the housing are arranged in a curved shape.

According to this configuration, the first connection portions of the plurality of terminals can be disposed so as to be shifted from each other, and as a result, it is possible to contribute to improvement in workability of electrical connection.

In the terminal base, the insert portion may be formed in the cylindrical shape including an opening and a bottom wall, and the bottom wall may be formed as the second connection portion According to this configuration, as will be described below in a section of another embodiment, the terminal can be reduced in size, and as a result, the terminal base can be reduced in size.

Figure 1:
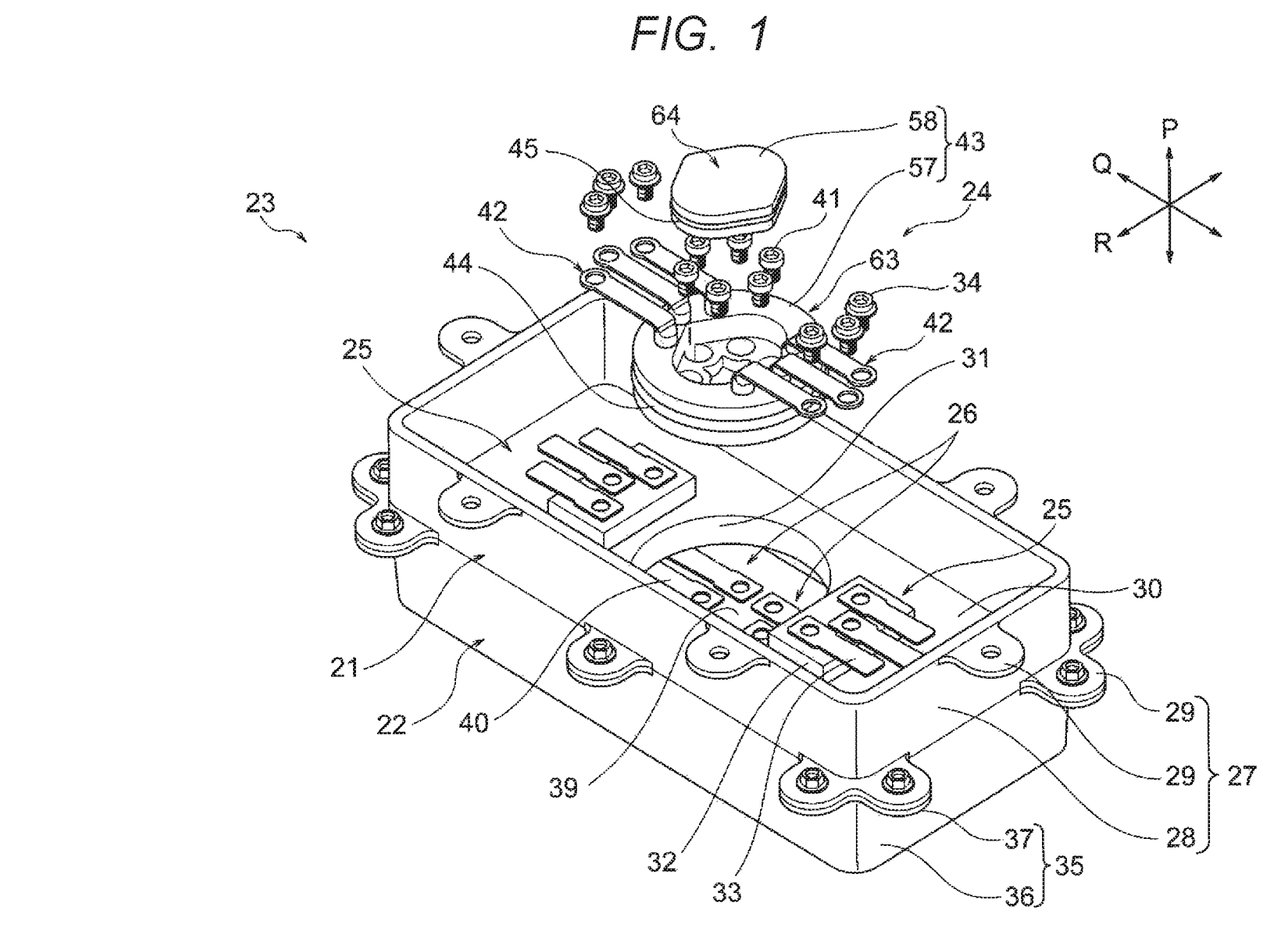
FIG. 1 is an exploded perspective view illustrating a terminal base and an electrical connection structure of devices according to an embodiment of the present invention.
Figure 2:
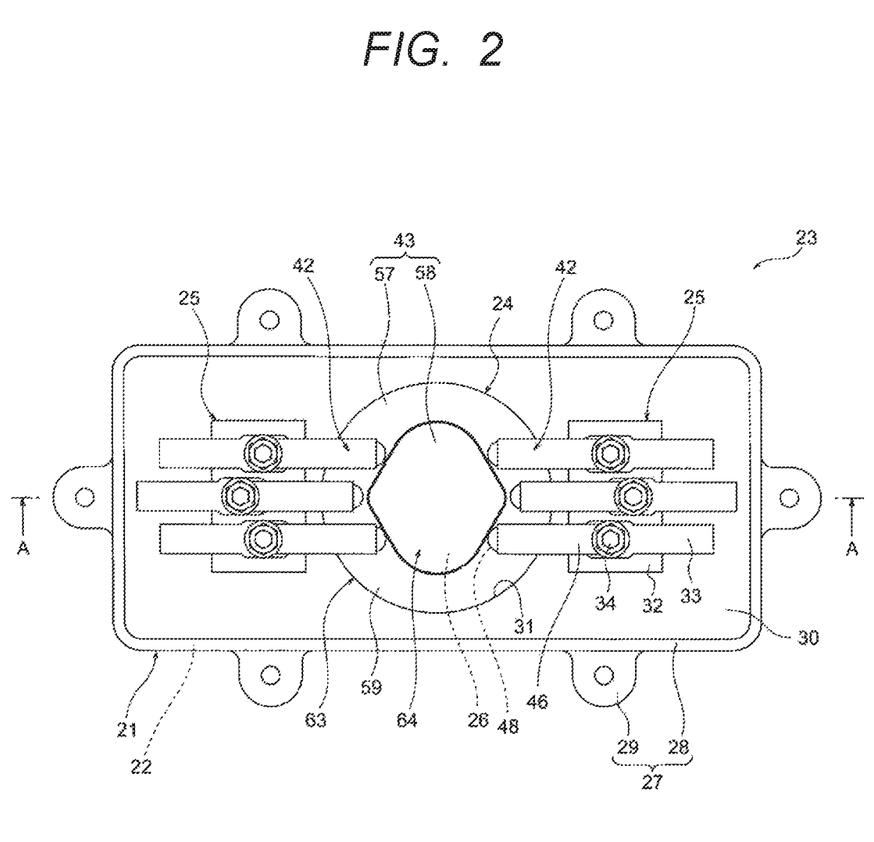
FIG. 2 is a top view of the terminal base and the electrical connection structure of devices in FIG. 1.
Figure 3:
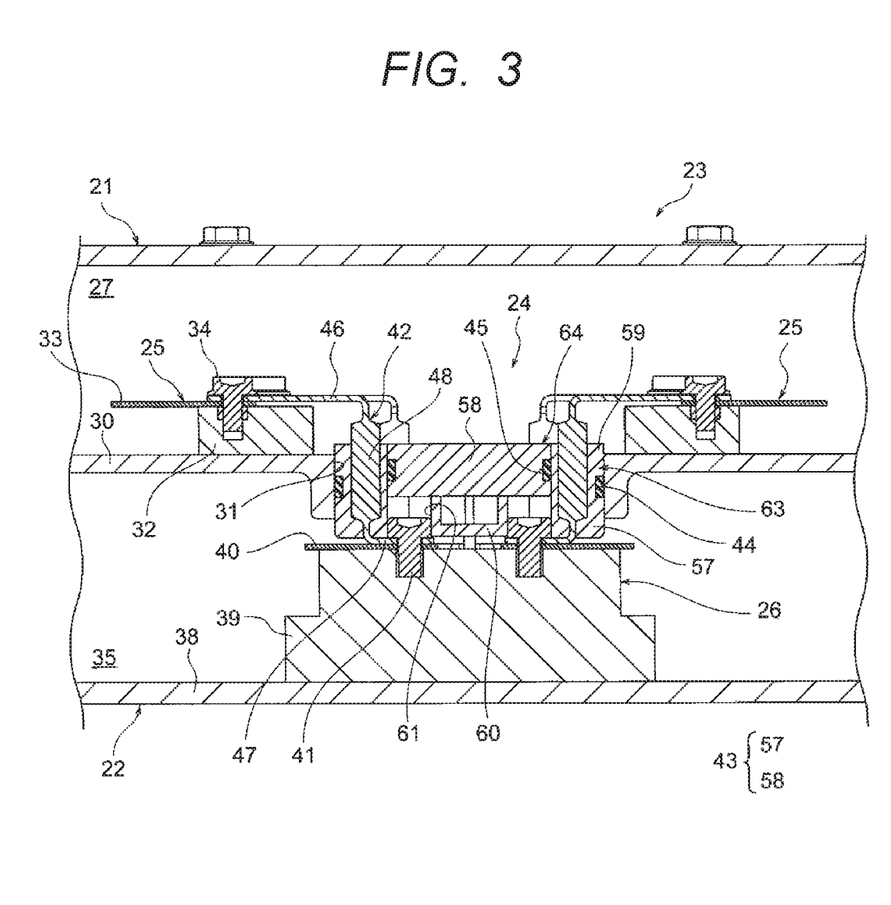
FIG. 3 is a cross-sectional view taken along a line A-A in FIG. 2.
Figure 4:
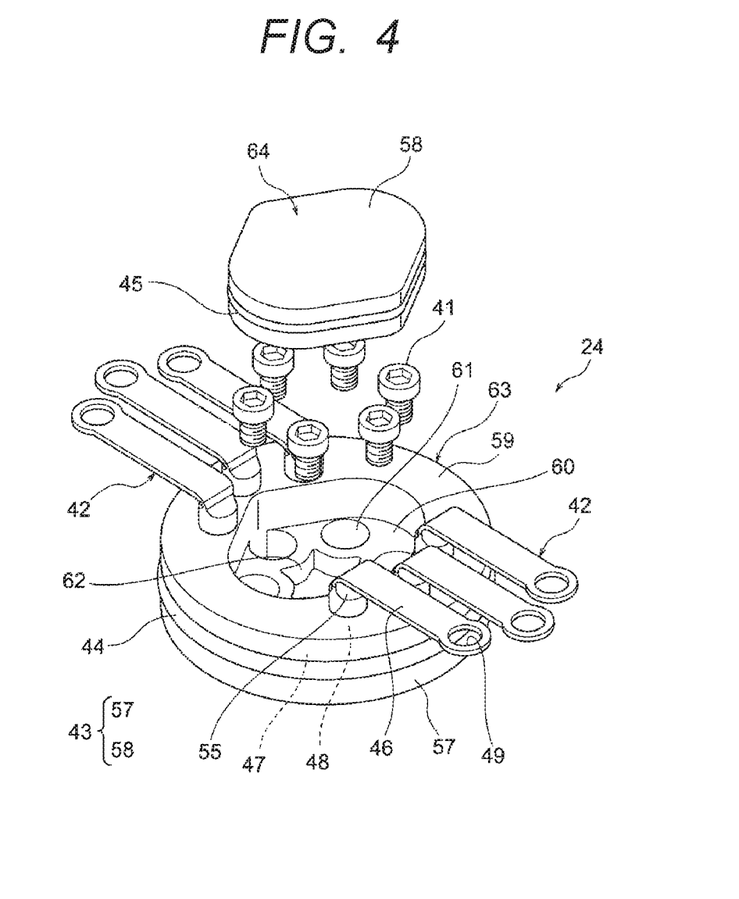
FIG. 4 is an exploded perspective view of the terminal base in FIG. 1.
Figure 5:
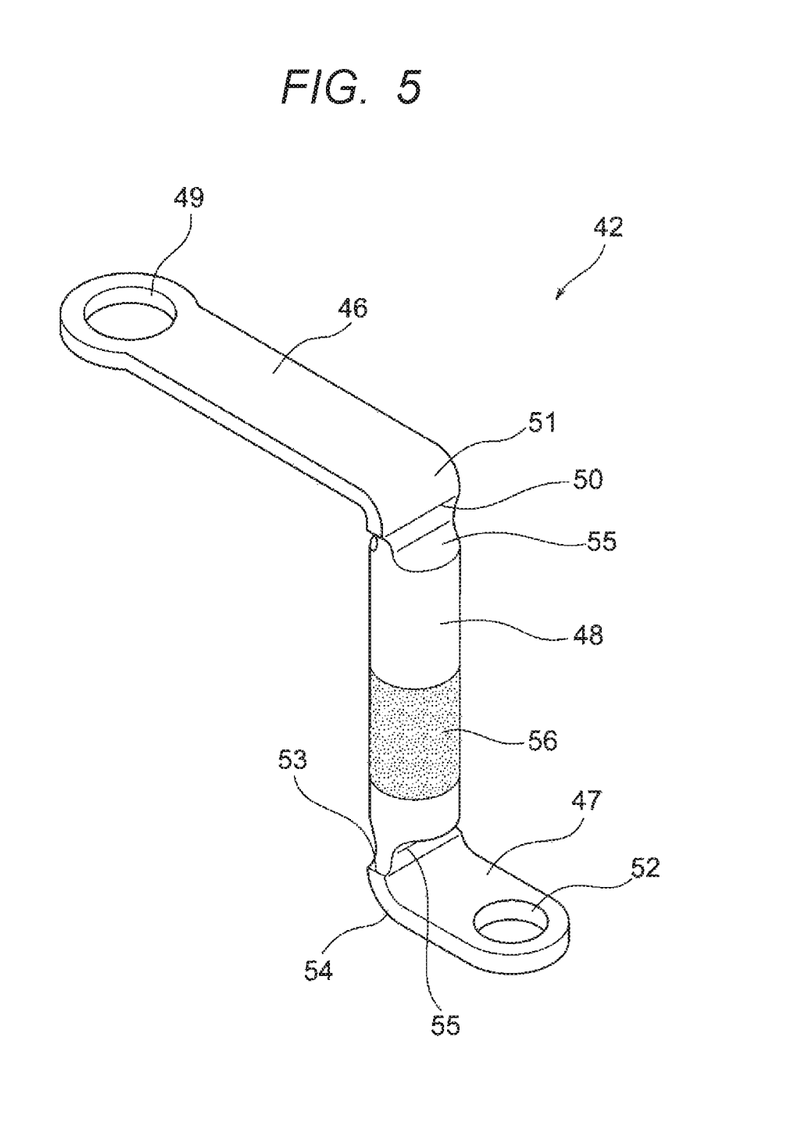
FIG. 5 is a perspective view of the terminal in FIG. 4.
Figure 6:
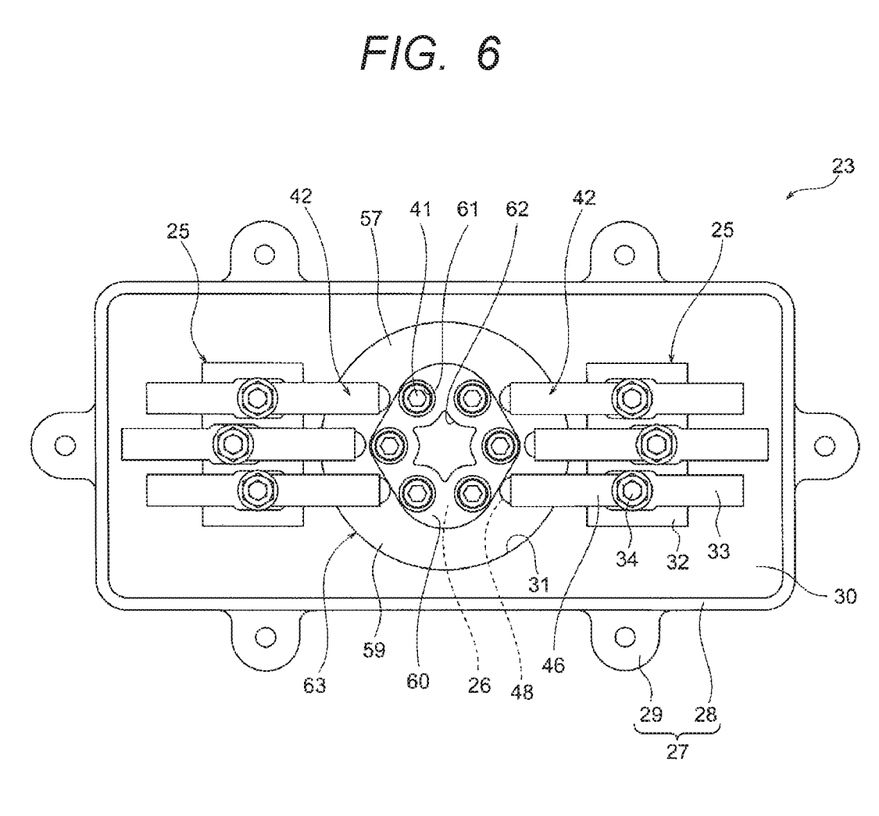
FIG. 6 is a top view illustrating a state before a housing lid in FIG. 1 is assembled.

An embodiment of the present invention will be described below with reference to the drawings. FIG. 1 is an exploded perspective view illustrating a terminal base and an electrical connection structure of devices according to the embodiment of the present invention. FIG. 2 is a top view of the terminal base and the electrical connection structure of devices in FIG. 1. FIG. 3 is a cross-sectional view taken along a line A-A in FIG. 2. FIG. 4 is an exploded perspective view of the terminal base in FIG. 1. FIG. 5 is a perspective view of the terminal in FIG. 4. FIG. 6 is a top view illustrating a state before a housing lid in FIG. 1 is assembled. In FIG. 1, an arrow P indicates an upper-lower direction, an arrow Q indicates a right-left direction, and an arrow R indicates a front-rear direction.

FIG. 1 illustrates an inverter 21 and a motor addition to a high voltage battery that are to be mounted on an electric vehicle or a hybrid vehicle. In order to electrically connect the inverter 21 and the motor 22 with each other, an electrical connection structure 23 and a terminal base 24 according to the embodiment of the present invention are used. In the electrical connection structure 23, two inverter terminal bases 25 and two motor terminal bases 26 are electrically connected with each other by the terminal base 24. More specifically, in the electrical connection structure 23, the three-phase inverter terminal bases 25 and the three-phase motor terminal bases 26 are electrically connected with each other by the one terminal base 24 according to the embodiment of the present invention (six phases in total). In addition, the electrical connection structure 23 is a highly operable structure which can be assembled (including an operation for the connection structure 23 being fastened) along the upper-lower direction indicated by the arrow P. Each of the above configurations will be described below.

As shown in FIGS. 1 to 3, the inverter 21 includes a terminal base housing 27 having a box shape. The terminal base housing 27 includes a bottomed and shallow accommodating body 28 and a plurality of fixing portions 29 formed at an edge of the accommodating body 28. A circular through hole 31 is formed at a center of a bottom wall 30 of the accommodating body 28. The accommodating body 28 includes two inverter terminal bases 25 on an inner surface of the bottom wall 30. The two inverter terminal bases 25 are disposed on both right and left sides of the through hole 31. The two inverter terminal bases 25 have the same structure, and are disposed such that electrical connection parts of the two inverter terminal bases 25 are located on sides of through hole 31. Each inverter terminal base 25 includes an electrically insulating terminal receiving portion 32 provided on the inner surface of the bottom wall 30, three electrically conductive bus bars 33 whose connection parts are placed on the terminal receiving portion 32, and three fastening bolts 34. The terminal receiving portion 32 is provided with a nut part without any reference numeral. Bolt insertion holes are formed in the connection parts of the bus bars 33. The three bus bars 33 are disposed such that positions of the bolt insertion holes are arranged in a curved shape. In other words, in the embodiment, the bolt insertion hole of bus bar 33 located in the center on the terminal receiving portion 32 is formed at a position farther from the through hole 31 than the bolt insertion holes of the adjacent bus bars 33. In terms of the inverter 21, a description about parts other than the inverter terminal bases 25 will be omitted. The fastening bolts 34 may be included as a part of the terminal base 24 described below.

As shown in FIGS. 1 and 3, the motor 22 includes a terminal base housing 35 having a box shape. The terminal base housing 35 includes a bottomed and shallow accommodating body 36 and a plurality of fixing portions 37 formed at an edge of the accommodating body 36. The terminal base housing 35 is formed to be fixed to a lower side of the terminal base housing 27 of the inverter 21. The accommodating body 36 includes two motor terminal bases 26 on an inner surface of a bottom wall 38. The two motor terminal bases 26 are disposed in accordance with a position of the through hole 31 of the inverter 21. In other words, the two motor terminal bases 26 are disposed at a position that can be seen through the through hole 31. The motor terminal bases 26 include an electrically insulating terminal receiving portion 39 provided on the inner surface of the bottom wall 38, six electrically conductive bus bars 40 whose connection parts are placed on the terminal receiving portion 39, and six fastening bolts 41. The terminal receiving portion 39 is provided with a nut part without any reference numeral. Bolt insertion holes are formed in the bus bars 40. The terminal receiving portion 39 is formed to serve as a common receiving portion for the six bus bars 40. The terminal receiving portion 39 is formed in a trapezoidal portion having a thickness larger than that of the terminal receiving portion 32 of the inverter 21. The six bus bars 40 are disposed so as to be divided into two groups of bus bars, each of the group including three bus bars. The three bus bars 40 of each group are disposed such that the positions of the bolt insertion holes of the three bus bars 40 are arranged in a curved shape on the terminal receiving portion 39. In terms of the motor 22, a description about parts other than the motor terminal bases 26 will be omitted. The fastening bolts 41 may be included as a part of the terminal base 24 described below.

As shown in FIGS. 1 to 4, the terminal base 24 is configured to electrically connect the inverter 21 and the motor 22 with each other. The terminal base 24 includes six electrically conductive terminals 42, an electrically insulating housing 43, and packing 44, 45. The terminal base 24 is formed so as to electrically connect the two inverter terminal bases 25 and the two motor terminal bases 26 with each other. In other words, the terminal base 24 is formed so as to electrically connect the six phases altogether simply by attaching the inverter terminal base 25 to the through hole 31 from above. A configuration and a structure of the terminal base 24 according to the embodiment can be applied to a case (not illustrated) where three phases instead of six are used. For example, a configuration and a structure of the terminal base 24 can be applied in which the terminal base 24 is divided into two parts at a center of the terminal base 24 in the right-left direction and one of the two parts is used.

As shown in FIGS. 1 to 5, each terminal 42 is formed by processing a electrically conductive metal cylindrical core wire (a so-called round bar). The six terminals 42 have the same structure. Each terminal 42 includes a first connection portion 46, a second connection portion 47, and an insert portion 48, and is formed in an illustrated shape. The first connection portion 46 is formed to be exposed to a side of the inverter 21. The first connection portion 46 is formed to be electrically connected with the inverter terminal base 25. The first connection portion 46 is formed in a bus bar shape (a tab shape) such that the cylindrical core wire is crushed to be a flat plate shape from a round bar state. A bolt insertion hole 49 is formed on one end side of the first connection portion 46, the bolt insertion hole 49 running through the one end side of the first connection portion 46. The bolt insertion hole 49 is formed in accordance with a size of the bolt 34 and disposed in accordance with a position of a bolt insertion hole (reference numeral omitted) of the bus bar 33 of the inverter terminal base 25. A periphery of the bolt insertion hole 49 is formed to be in surface contact with the bus bar 33 of the inverter terminal base 25. The other end side of the first connection portion 46 is formed as a continuous portion 50 with respect to the insert portion 48. A bent portion 51 is formed in a vicinity of the continuous portion 50. The bent portion 51 is formed by bending the first connection portion 46 by 90 degrees with respect to the insert portion 48. The first connection portion 46 is formed to extend longer than the second connection portion 47.

As shown in FIGS. 3 and 5, the second connection portion 47 is formed to be exposed to a side of the motor 22. The second connection portion 47 is formed to be electrically connected with the motor terminal base 26. Similarly to the first connection portion 46, the second connection portion 47 is formed in a bus bar shape (a tab shape) such that the circular core wire is crushed from a round bar state into a flat plate shape. A bolt insertion hole 52 is formed on one end side of the second connection portion 47, the bolt insertion hole 52 running through the one end side of the second connection portion 47. The bolt insertion hole 52 is formed in accordance with a size of the bolt 41 and disposed in accordance with a position of a bolt insertion hole (reference numeral omitted) of the bus bar 40 of the motor terminal base 26. A periphery of the bolt insertion hole 52 is formed to be in surface contact with the bus bar 40 of the motor terminal base 26. The other end side of the second connection portion 47 is formed as a continuous portion 53 with respect to the insert portion 48. A bent portion 54 is formed in a vicinity of the continuous portion 53. The bent portion 54 is formed by bending the second connection portion 47 by 90 degrees with respect to the insert portion 48. The 90-degree bending of the second connection portion 47 is in an opposite direction to the 90-degree bending of the first connection portion 46. Each terminal 42 is formed in a substantially crank shape as a whole by the 90-degree bending.

As shown in FIGS. 3 to 5, the insert portion 48 is insert-molded (molded) in the housing 43. Continuous portions 55, which are continuous with the first connection portion 46 and the second connection portion 47 generated by crushing, are formed at one end and the other end of the insert portion 48. A main part of the insert portion 48 is formed in a columnar shape. That is, a main part of the insert portion 48 remains as the above-described cylindrical core wire (the round bar state) and is not formed by being punched out as in a related art. Therefore, the main part of the insert portion 48 is formed without a sag, a fracture surface, or a burr. The main part of the insert portion 48 is formed as a round-shaped bus bar. A surface processed portion 56 is formed over an entire circumference of an outer surface of the insert portion 48 according to the embodiment. The surface processed portion 56 is formed by known laser processing. The surface processed portion 56 is formed in a shape having minute irregularities. The surface processed portion 56 is formed to stabilize an insert molded state of the insert portion 48. That is, the surface processed portion 56 is formed in a functional portion which ensures adhesion reliability of the insert portion 48 with the housing 43 and improves waterproof and oilproof properties. The surface processing portion 56 is formed such that a width of the surface processing portion 56 in the upper-lower direction indicated by the arrow P is a desired dimension. Formation of the surface processed portion 56 is arbitrary (it is preferable to form the surface processed portion 56).

As shown in FIGS. 1 to 4, the housing 43 is an electrically insulating resin member (resin molded article), and includes a housing body 57 in which the six terminals 42 are insert-molded and a housing lid 58 which is to be assembled to the housing body 57. The housing body 57 includes a thick peripheral wall 59 and a bottom wall 60 which is formed to cover a lower side of the peripheral wall 59, and is formed in a shallow cylindrical shape as illustrated in the drawings. An outer peripheral surface of the peripheral wall 59 is formed in a circular shape, but an inner peripheral surface of the peripheral wall 59 is formed in a non-circular shape (see FIG. 6). Therefore, although the peripheral wall 59 is thick, the peripheral wall 59 is formed in a shape having a non-constant thickness. The peripheral wall 59 is shaped such that the insert portions 48 of the terminals 42 can be aligned on a substantially V-shaped curve. A groove (reference numeral omitted) to which the annular packing 44 is to be attached is formed over an entire circumference of the outer peripheral surface of the peripheral wall 59. This groove is formed in accordance with the position of the through hole 31 of the terminal base housing 27 in the inverter 21. The packing 44 is configured to contact the edge of the through hole 31 to ensure the waterproof and oilproof properties. Six bolt insertion holes 61 are formed in the bottom wall 60, the bolt insertion holes running through the bottom wall 60. The six bolt insertion holes 61 are formed in accordance with a position of the bolt insertion hole 52 of the second connection portion 47 in terminal 42. A reference numeral 62 in the bottom wall 60 denotes a hole portion. The hole portion 62 is formed in a substantially star shape in top view. The housing lid 58 is formed to fit a shape defined by the inner peripheral surface of the peripheral wall 59. A groove (reference numeral omitted) to which the annular packing 45 is to be attached is formed over an entire circumference of an outer peripheral surface of the housing lid 58. The packing 45 is configured to contact the inner peripheral surface of the peripheral wall 59 to ensure the waterproof and oilproof properties.

As shown in FIGS. 3 and 4, when each terminal 42 is also molded together at a time of resin molding of the housing body 57, the insert portion 48 is buried and held in the peripheral wall 59 such that an upper part of the main part of the insert portion 48 is slightly exposed. In the embodiment, the continuous portion 55 continuous with the second connection portion 47 is also buried and held in the peripheral wall 59. The second connection portion 47 extends along an outer surface of the bottom wall 60. The bolt insertion hole 52 of the second connection portion 47 is disposed so as to fit the bolt insertion hole 61 of the bottom wall 60. The insert portion 48 is shaped such that a sag, a fracture surface, or a burr is not generated. Therefore, resin cracking does not occur in the housing body 57.

First, as illustrated in FIG. 4, the housing body 57 to which the terminals 42 are insert-molded and the packing 44 is assembled (hereinafter, referred to as a terminal base body 63) and the housing lid 58 to which the packing 45 is assembled (hereinafter, referred to as a terminal base lid 64) are prepared. Then, the terminal base body 63 and the terminal base lid 64 are disposed as illustrated in FIG. 1. Next, the terminal base body 63 is assembled to the through hole 31 of the terminal base housing 27 of the inverter 21. Then, the first connection portion 46 and the bus bar 33, which are overlapped with each other, are fastened by the bolt 34 and the second connection portion 47 and the bus bar 40, which are overlapped with each other, are fastened by the bolt 41, so that operation is performed to get to a state as illustrated in FIG. 6. Since positions at which the first connection portion 46 and the bus bar 33 are fastened by the bolt 34 are shifted in the right-left direction (fastening positions are arranged alternately) and positions at which the second connection portion 47 and the bus bar 40 are fastened by the bolt 41 are shifted in the right-left direction (fastening positions are arranged alternately), a space for using a tool can be sufficiently ensured. As a result fastening operation can be performed smoothly. Finally, the terminal base lid 64 is assembled to the terminal base body 63, so that operation is performed to get to a state as illustrated in FIGS. 2 and 3. A series of operation to realize the electrical connection structure 23 of the inverter 21 and the motor 22 is completed through the above steps.

As described above with reference to FIGS. 1 to 6, according to the terminal base 24 in the embodiment of the present invention, a part of the terminal 42, the part being insert-molded in the housing 43, is formed in a columnar shape, that is, the part of each terminal 42 insert-molded in the housing 43 is formed as a round-shaped bus bar. Therefore, it is not necessary to punch out a flat bus bar as in the related art, as long as the part of the terminal 42 insert-molded in the housing 43 is formed in the cylindrical shape, and as a result, the sag 10, the fracture surface 11, or the burr 12 (see FIG. 12C) is not generated. Therefore, according to the terminal base 24, resin cracking does not occur on a side of housing 43 and oil will not get inside, for example. Therefore, reliability of the insert molding can be sufficiently ensured.

Figure 7:
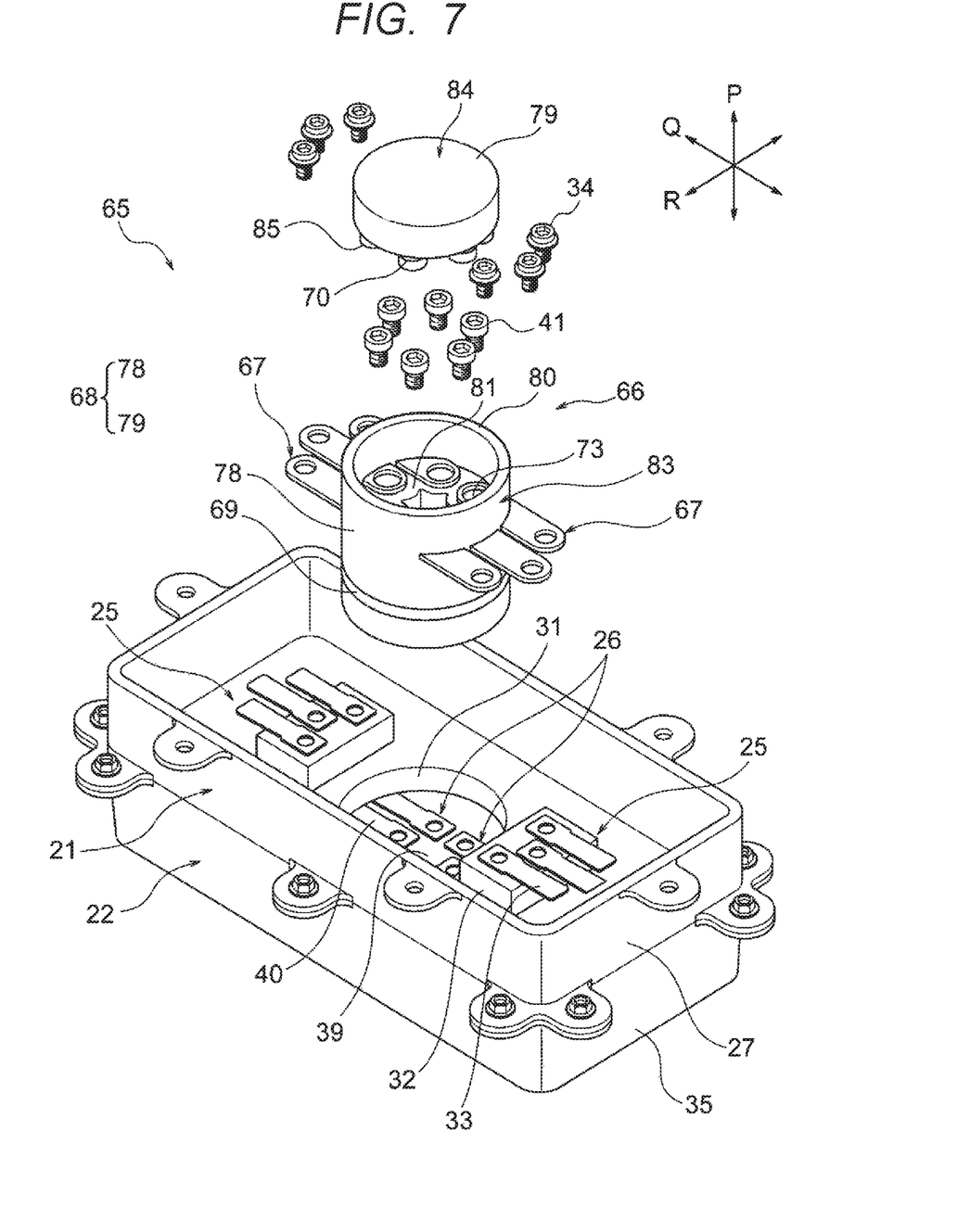
FIG. 7 is an exploded perspective view illustrating a terminal base and an electrical connection structure of devices according to another embodiment of the present invention.
Figure 8:
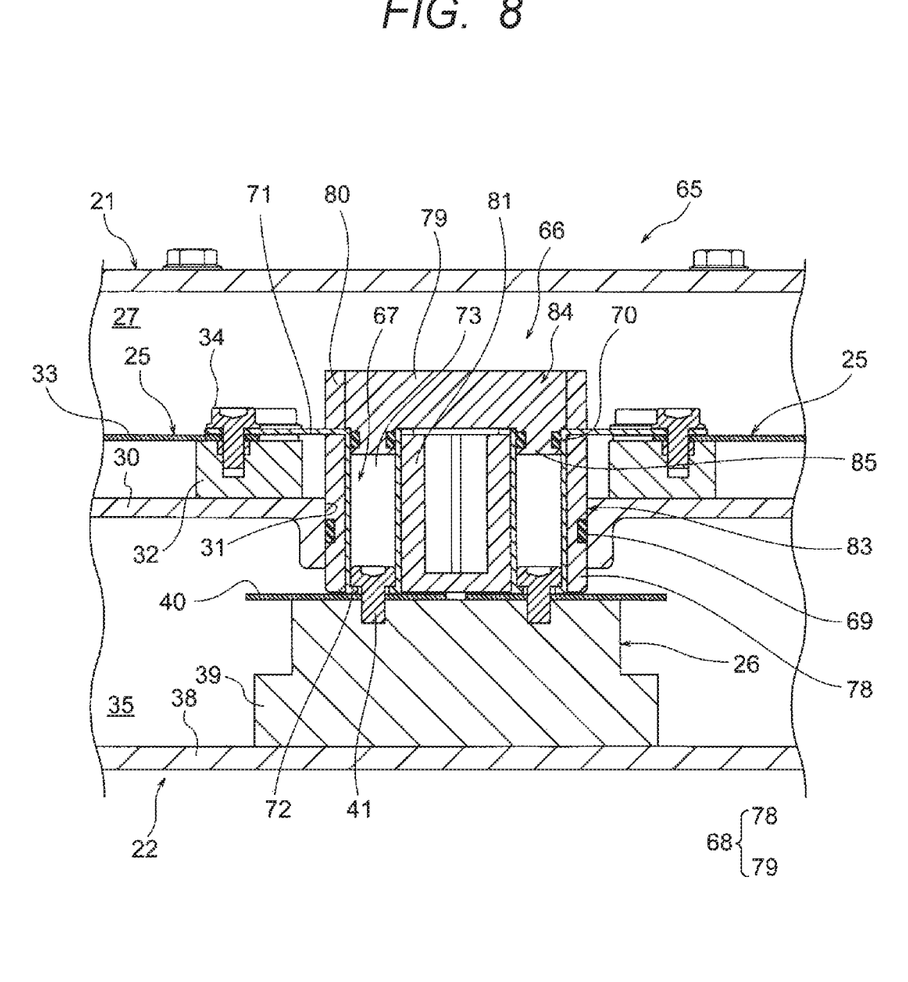
FIG. 8 is a cross-sectional view of the terminal base and the electrical connection structure of devices in FIG. 7.
Figure 9:
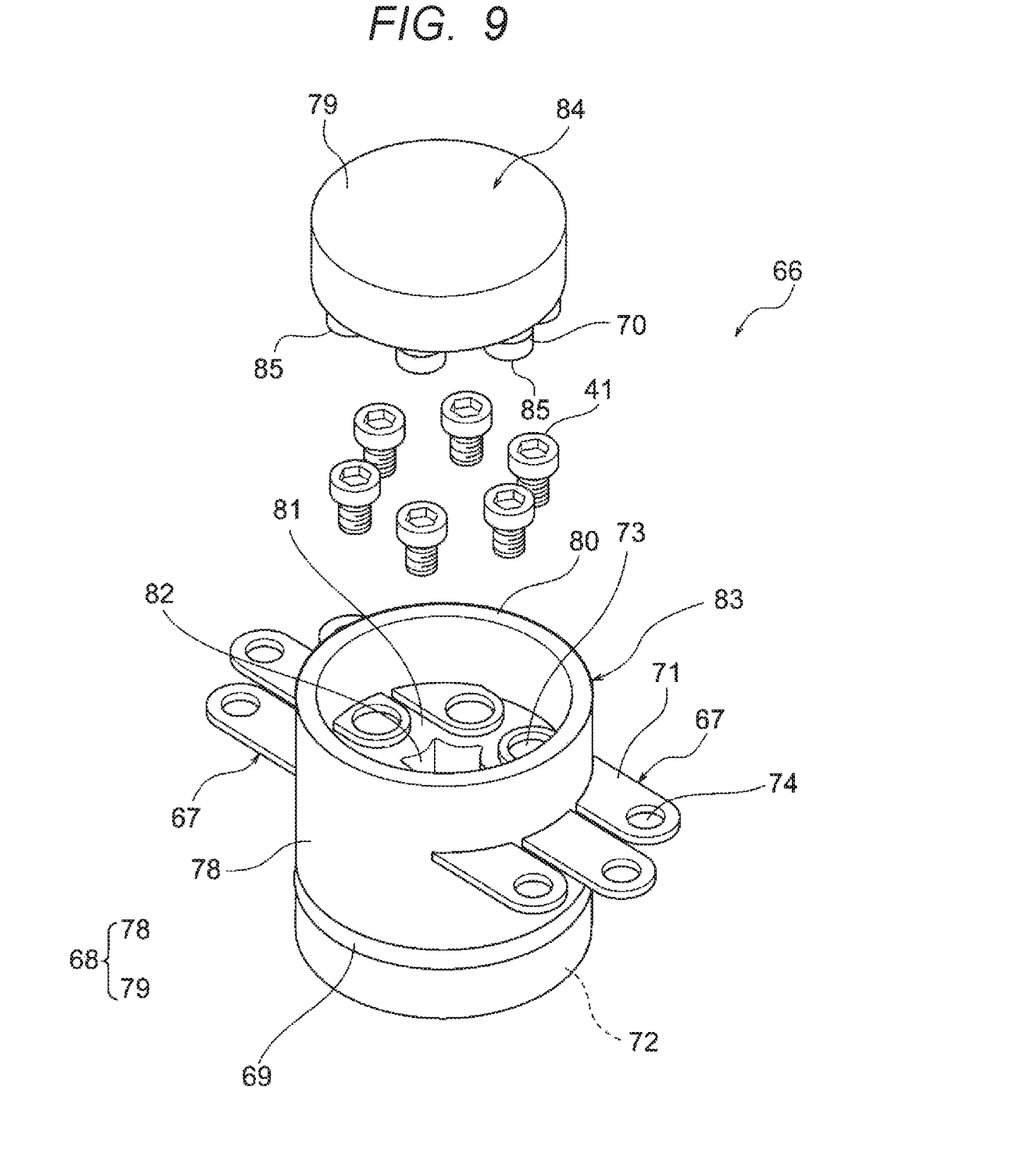
FIG. 9 is an exploded perspective view of the terminal base in FIG. 7.
Figures 10A, 10B:
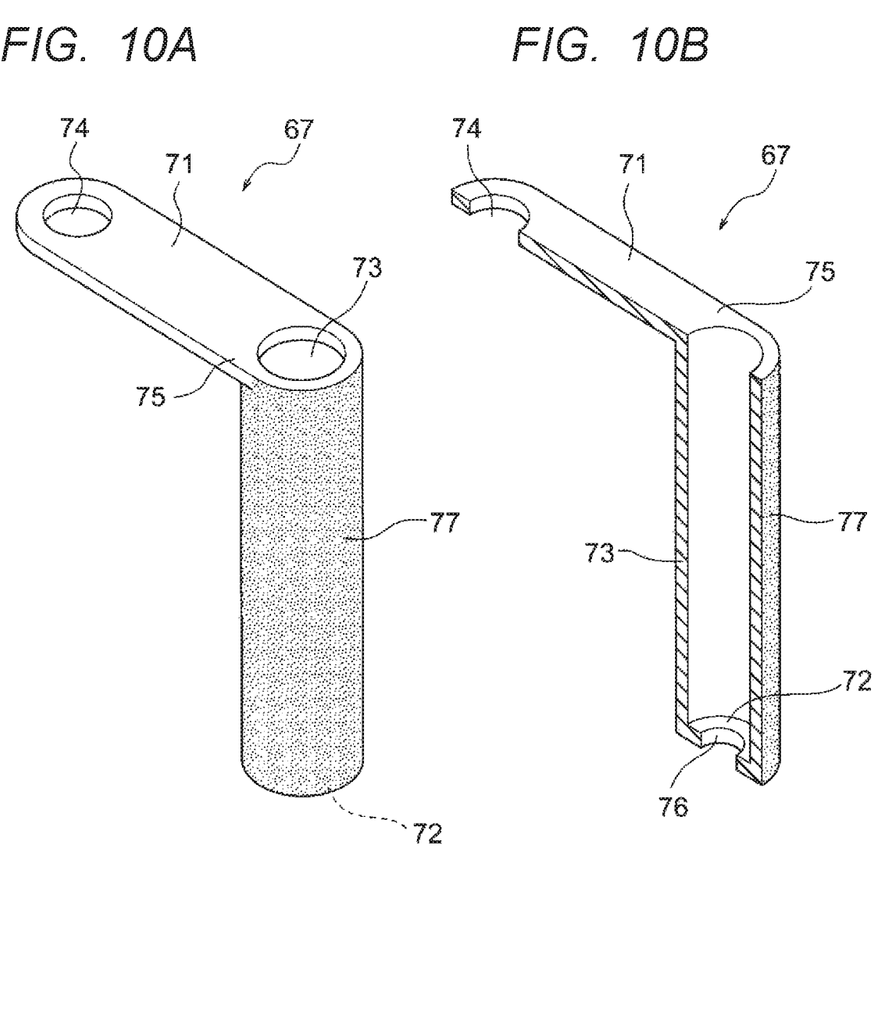
Figure 11:
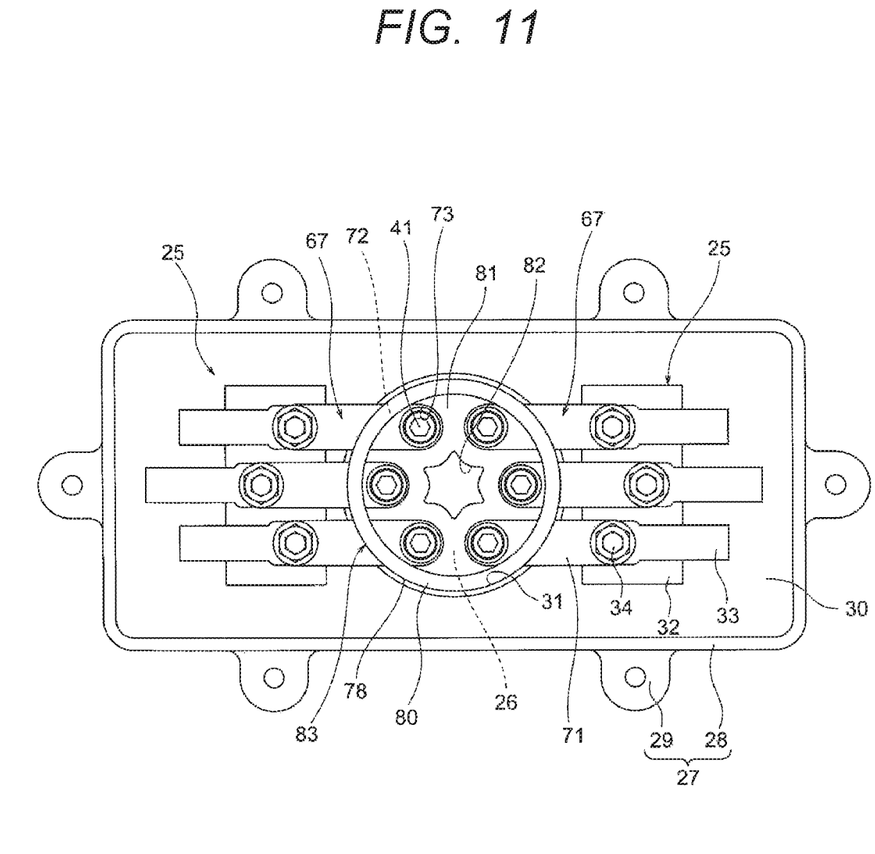
FIG. 11 is a top view illustrating a state before a housing lid in FIG. 7 is assembled.

The another embodiment will be described below with reference to the drawings. FIG. 7 is an exploded perspective view illustrating a terminal base and an electrical connection structure of devices according to the another embodiment of the present invention. FIG. 8 is a cross-sectional view of the terminal base and the electrical connection structure of devices in FIG. 7. FIG. 9 is an exploded perspective view of the terminal base in FIG. 7. FIGS. 10A and 10B are views of the terminal in FIG. 9, in which FIG. 10A is a perspective view, and FIG. 10B is a cross-sectional view. FIG. 11 is a top view illustrating a state before a housing lid in FIG. 7 is assembled. The components that are also used in the embodiment are denoted by the same reference numerals, and a detailed description thereof is omitted. In FIG. 7, an arrow P indicates an upper-lower direction, an arrow Q indicates a right-left direction, and an arrow R indicates a front-rear direction.

In FIG. 7 illustrates the inverter 21 and the motor 22 in addition to a high voltage battery that are to be mounted on an electric vehicle or a hybrid vehicle. In order to electrically connect the inverter 21 and the motor 22 with each other, an electrical connection structure 65 and a terminal base 66 according to the another embodiment of the present invention are used. In the electrical connection structure 65, the two inverter terminal bases 25 and similarly the two motor terminal bases 26 are electrically connected with each other by the terminal base 66. More specifically, in the electrical connection structure 65, the three-phase inverter terminal bases 25 and the three-phase motor terminal bases 26 are electrically connected with each other by the one terminal base 66 according to the another embodiment of the present invention in two pairs (six phases in total). In addition, the electrical connection structure 65 is a highly operable structure which can be subject to assembly operation (including an operation for the connection structure 65 being fastened) along the upper-lower direction indicated by the arrow P. Each of the above configurations will be described below.

In FIGS. 7 to 9, the terminal base 66 is configured to electrically connect the inverter 21 and the motor 22 with each other. The terminal base 66 includes six electrically conductive terminals 67, an electrically insulating housing 68, and packing 69, 70. The terminal base 66 is formed so as to electrically connect the two inverter terminal bases 25 and the two motor terminal bases 26 with each other. In other words, the terminal base 66 is formed so as to electrically connect the six phases altogether simply by attaching the inverter terminal base 25 to the through hole 31 from above. A configuration and a structure of the terminal base 66 according to the another embodiment can be applied to a case (not illustrated) where three phases instead of six are used. For example, a configuration and a structure of the terminal base 66 can be applied in which the terminal base 66 is divided into two parts at a center of the terminal base 66 in the right-left direction and one of the two parts is used.

In FIGS. 7 to 10B, each terminal 67 is formed by processing a electrically conductive metal plate. The six terminals 67 have the same structure. Each terminal 67 includes a first connection portion 71, a second connection portion 72, and an insert portion 73, and is formed in an illustrated shape. The first connection portion 71 is formed to be exposed to the side of the inverter 21. The first connection portion 71 is formed to be electrically connected with the inverter terminal base 25. The first connection portion 71 is formed in the same shape as the first connection portion 46 (see FIG. 5) according to the embodiment. A bolt insertion hole 74 is formed on one end side of the first connection portion 71, the bolt insertion hole 74 running through the one end side of the first connection portion 71. The bolt insertion hole 74 is formed in accordance with a size of the bolt 34 and disposed in accordance with the position of the bolt insertion hole (reference numeral omitted) of the bus bar 33 of the inverter terminal base 25. A periphery of the bolt insertion hole 74 is formed to be in surface contact with the bus bar 33 of the inverter terminal base 25. The other end side of the first connection portion 71 is formed as a continuous portion 75 with respect to the insert portion 73.

As shown in FIGS. 8 and 10B, the second connection portion 72 is formed to be exposed at a motor 22 side. The second connection portion 72 is formed to be electrically connected with each motor terminal base 26. The second connection portion 72 is shaped so as to also serve as a bottom wall part of the insert portion 73. A bolt insertion hole 76 is formed in the second connection portion 72 to penetrate the second connection portion 72. The bolt insertion hole 76 is formed in accordance with a size of the bolt 41 and in accordance with disposing of a bolt insertion hole (reference numeral omitted) of the bus bar 40 of each motor terminal base 26. A periphery of the bolt insertion hole 76 is formed to be in surface contact with the bus bar 40 of each motor terminal base 26.

As shown in FIGS. 7 to 10B, the insert portion 73 is insert-molded (molded) in the housing 68. The insert portion 73 is formed by drawing the metal plate. The insert portion 73 is formed in a cylindrical shape including an opening and a bottom wall as illustrated in the drawings. The insert portion 73 is formed by drawing as described above and is not formed by being punched out. Therefore, a sag, a fracture surface, or a burr is not generated on the insert portion 73. A surface processed portion 77 is formed over an entire circumference of an outer surface of the insert portion 73. The surface processed portion 77 is formed by known laser processing. The surface processed portion 77 is formed in a shape having minute irregularities. The surface processed portion 77 is formed to stabilize a insert molded state of the insert portion 73. That is, the surface processed portion 77 is formed in a functional portion which ensures adhesion reliability of the insert portion 73 with the housing 68 and improves waterproof and oilproof properties. The surface processed portion 77 according to the another embodiment may be formed on the entire outer surface of the insert portion 73 (may be formed with the width as in the embodiment. Formation of the surface processed portion 77 is arbitrary). As another form of the insert portion 73, a shape of a round cylindrical portion can be formed by press operation. In this case, a sag or a burr may appear on the outer surface of the insert portion 73. However, it is a matter of course that influence can be reduced as compared with a related art.

As shown in FIGS. 7 to 11, the housing 68 is an electrically insulating resin member (resin molded article), and includes a housing body 78 in which the six terminals 67 are insert-molded and a housing lid 79 which is to be assembled to the housing body 78. The housing body 78 includes a peripheral wall 80 which is thinner than that in the embodiment and a terminal insertion portion 81 which is disposed continuously with an inner side of the peripheral wall 80. The housing body 78 is formed in a substantially cylindrical shape as illustrated in the drawings. A groove (reference numeral omitted) to which the annular packing 69 is to be attached is formed over an entire circumference of an outer peripheral surface of the peripheral wall 80. The groove is formed in accordance with the position of the through hole 31 of the terminal base housing 27 of the inverter 21. The packing 69 is configured to contact the edge of the through hole 31 to ensure the waterproof and oilproof properties. The terminal insertion portion 81 is shaped such that the insert portions 73 of the terminals 67 can be aligned on a substantially V-shaped curve. A reference numeral 82 denotes a hole portion. The hole portion 82 is formed in a substantially star shape in top view. The housing lid 79 is formed to fit a shape defined by the inner peripheral surface of the peripheral wall 80. Six cylindrical insertion portions 85 are formed on a lower surface of the housing lid 79. Each cylindrical insertion portion 85 is formed in a circular convex portion which is to be inserted into and plug the insert portion 73. A groove (reference numeral omitted) to which the annular packing 70 is to be attached is formed over an entire circumference of an outer peripheral surface of each cylindrical insertion portion 85. The packing 70 is configured to contact the inner peripheral surface of the insert portion 73 to ensure the waterproof and oilproof properties.

As shown in FIGS. 8 and 9, by molding each terminal 67 together with the housing body 78, the insert portion 73 is buried and held in the terminal insertion portion 81 such that an upper part of the insert portion 73 is opened. The first connection portion 71 penetrates the peripheral wall 80, and the second connection portion 72 is exposed along a lower surface of the housing 68. Since the insert portion 73 is formed without a sag, a fracture surface, or a burr, resin cracking does not occur in the housing body 78.

First, as illustrated in FIG. 9, the housing body 78 to which the terminals 67 are insert-molded and the packing 69 is assembled (hereinafter, referred to as a terminal base body 83) and the housing lid 79 to which the packing 70 is assembled (hereinafter, referred to as a terminal base lid 84) are prepared. Then, the terminal base body 83 and the terminal base lid 84 are disposed as illustrated in FIG. 7. Next, the terminal base body 83 is assembled to the through hole 31 of the terminal base housing 27 of the inverter 21. Then, the first connection portion 71 and the bus bar 33, which are overlapped with each other, are fastened by the bolt 34 and the second connection portion 72 and the bus bar 40, which are overlapped with each other, are fastened by the bolt 41, so that operation is performed to get to a state as illustrated in FIG. 11. Since positions at which the first connection portion 71 and the bus bar 33 are fastened by the bolt 34 are shifted in the right-left direction (fastening positions are arranged alternately) and positions at which the second connection portion 72 and the bus bar 40 are fastened by the bolt 41 are shifted in the right-left direction (fastening positions are arranged alternately), a space for using a tool can be sufficiently ensured. As a result fastening operation can be performed smoothly similarly to the embodiment. Finally, the terminal base lid 84 is assembled to the terminal base body 83, so that operation is performed to get to a state as illustrated in FIG. 8. A series of operation to realize the electrical connection structure 65 of the inverter 21 and the motor 22 is completed through the above steps.

As described above with reference to FIGS. 7 to 11, according to the terminal base 66 in the another embodiment of the present invention, a part of each terminal 67, the part being insert-molded in the housing 68, is formed in a cylindrical shape. Therefore, it is not necessary to punch out a flat bus bar, and as a result, the sag 10, the fracture surface 11, or the burr 12 (see FIG. 12C) is not generated. Therefore, according to the terminal base 66, resin cracking does not occur on a side of housing 68, and oil will not get inside, for example. Therefore, reliability of the insert molding can be sufficiently ensured.

The terminal base 66 according to the another embodiment can be reduced in size as compared with the terminal base 24 according to the embodiment. This can be read from FIG. 11 with FIG. 6. A shape of each terminal 67 according to the another embodiment contributes to the size reduction of the terminal base 66.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

What is claimed is:

1. A terminal base comprising:

a plurality of terminals configured to electrically connect a first device and a second device to each other, each of the plurality of terminals being electrically conductive; and a housing configured to hold the plurality of terminals, the housing being made of an electrically insulating resin, wherein each of the plurality of terminals comprises a first connection portion exposed to an outside of the housing so as to be connected to the first device, a second connection portion exposed to the outside of the housing so as to be connected to the second device, and an insert portion insert-molded in the housing, wherein the insert portion has a solid cylindrical shape or a hollow cylindrical shape, wherein the insert portion comprises a surface processed portion over an entire circumference of an outer surface of the insert portion, and wherein the surface processed portion is formed by laser processing and is formed in a shape having minute irregularities.

2. The terminal base according to claim 1, wherein, for each of the plurality of terminals, the first connection portion extends in a direction substantially orthogonal to a direction in which the insert portion extends, and wherein the housing is configured such that, positions at which the insert portions of the plurality of terminals are located in the housing are arranged along a curve.

3. The terminal base according to claim 1, wherein the insert portion has the hollow cylindrical shape including an opening and a bottom wall, and wherein the bottom wall is the second connection portion.

4. The terminal base according to claim 1, wherein each of the plurality of terminals has a first bent portion located between the first connection portion and the insert portion, each of the plurality of terminals has a second bent portion located between the insert portion and the second connection portion, for each of the plurality of terminals, a tip end of the first connection portion extends in a direction orthogonal to a direction in which the insert portion extends, and the second connection portion extends in a direction that is orthogonal to the insertion portion, and the second connection portion and the first connection portion extend in opposing directions.

5. The terminal base according to claim 1, wherein the first connection portion, the second connection portion and the insert portion are formed integrally with each other as a one-piece structure.

6. An electrical connection structure of devices comprising:

a first device;

a second device; and a terminal base, wherein the first device and the second device are electrically connected with each other by the terminal base, and wherein the terminal base comprises;

a first plurality of terminals configured to electrically connect the first device and the second device to each other, each of the first plurality of terminals being electrically conductive; and a housing configured to hold the first plurality of terminals, the housing being made of an electrically insulating resin, wherein each of the first plurality of terminals comprises a first connection portion exposed to an outside of the housing so as to be connected to the first device, a second connection portion exposed to the outside of the housing so as to be connected to the second device, and an insert portion insert-molded in the housing, wherein the insert portion has a solid cylindrical shape or a hollow cylindrical shape, wherein the insert portion comprises a surface processed portion over an entire circumference of an outer surface of the insert portion, and wherein the surface processed portion is formed by laser processing and is formed in a shape having minute irregularities.

7. The electrical connection structure according to claim 6, wherein, for each of the first plurality of terminals, a tip end the first connection portion extends in a direction orthogonal to a direction in which the insert portion extends.

8. The electrical connection structure according to claim 6, wherein the first device has a second plurality of terminals and the second device has a third plurality of terminals, the first connection portions of the first plurality of terminals of the terminal base are mounted to the second plurality of terminals of the first device, and the second connection portions of the first plurality of terminals of the terminal base are mounted to the third plurality of terminals of the second device.

9. The electrical connection structure according to claim 6, wherein the first connection portion, the second connection portion and the insert portion are formed integrally with each other as a one-piece structure.

* * * * *